(12) United States Patent
Rhoten et al.

(10) Patent No.: US 7,711,868 B2
(45) Date of Patent: May 4, 2010

(54) WAKING A MAIN COMPUTER SYSTEM TO PRE-FETCH DATA FOR AN AUXILIARY COMPUTING DEVICE

(75) Inventors: Matthew P. Rhoten, Kirkland, WA (US); Andrew J. Fuller, Redmond, WA (US); Roger H. Wynn, Redmond, WA (US); Michael S. Bernstein, Bothell, WA (US); Daniel J. Polivy, Seattle, WA (US); Otto G. Berkes, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1385 days.

(21) Appl. No.: 10/996,558

(22) Filed: Nov. 23, 2004

(65) Prior Publication Data

US 2006/0129855 A1 Jun. 15, 2006

(51) Int. Cl.
*G06F 3/00* (2006.01)
*G06F 13/12* (2006.01)
(52) U.S. Cl. .............................. 710/15; 710/16; 710/17; 710/18; 710/36; 710/62
(58) Field of Classification Search ....................... None
See application file for complete search history.

(56) References Cited

U.S. PATENT DOCUMENTS

| | | | |
|---|---|---|---|
| 4,860,342 A | 8/1989 | Danner | |
| 5,159,445 A | 10/1992 | Gitlin | |
| 5,388,268 A | 2/1995 | Beach | |
| 5,412,417 A | 5/1995 | Tozuka | |
| 5,487,181 A | 1/1996 | Dailey | |
| 5,491,800 A | 2/1996 | Goldsmith | |
| 5,519,772 A | 5/1996 | Akman | |
| 5,533,115 A | 7/1996 | Hollenbach | |

(Continued)

FOREIGN PATENT DOCUMENTS

EP 0772327 A2 5/1997

(Continued)

OTHER PUBLICATIONS

Anonymous, International Search Report in Corresponding EP Application No. EP 04 00 9868.

(Continued)

*Primary Examiner*—Alan Chen
(74) *Attorney, Agent, or Firm*—Workman Nydegger

(57) ABSTRACT

An auxiliary computing device wakes an associated main computer system to obtain data as needed, on-demand and/or in anticipation of demand. The wakeup operation is ordinarily temporary to fetch data, whereby only a small amount of power is consumed by the main computer system. In one implementation, a control channel between the auxiliary device and the main computer system is used to signal a wakeup. A main data channel is used to obtain the data, whereby the auxiliary device has access to a larger amount of data than it can cache. Moreover, the components of the main computer system may be leveraged, such as to use the main computer system's digital rights management mechanisms. Additional data may be intelligently requested by the auxiliary device while the main computer system is powered up, e.g., to buffer media, and/or request a synchronization of calendar data, email data, and so forth.

12 Claims, 8 Drawing Sheets

U.S. PATENT DOCUMENTS

| | | |
|---|---|---|
| 5,546,538 A | 8/1996 | Cobbley |
| 5,568,540 A | 10/1996 | Greco et al. |
| 5,657,414 A | 8/1997 | Lett |
| 5,675,374 A | 10/1997 | Kohda |
| 5,675,810 A | 10/1997 | Sellers |
| 5,745,761 A | 4/1998 | Celi |
| 5,764,901 A | 6/1998 | Skarbo |
| 5,768,164 A | 6/1998 | Hollon |
| 5,802,305 A | 9/1998 | McKaughan |
| 5,831,606 A | 11/1998 | Nakajima |
| 5,907,604 A | 5/1999 | Hsu |
| 5,959,622 A | 9/1999 | Greer |
| 5,978,837 A | 11/1999 | Foladare |
| 5,987,106 A | 11/1999 | Kitamura |
| 5,991,822 A | 11/1999 | Mealey |
| 5,991,836 A | 11/1999 | Renda |
| 5,999,613 A | 12/1999 | Nabkel |
| 6,006,285 A | 12/1999 | Jacobs |
| 6,008,806 A | 12/1999 | Nakajima |
| 6,052,442 A | 4/2000 | Cooper |
| 6,101,610 A | 8/2000 | Beebe |
| 6,144,363 A | 11/2000 | Alloul |
| 6,144,644 A | 11/2000 | Bajzath |
| 6,160,550 A | 12/2000 | Nakajima |
| 6,172,703 B1 | 1/2001 | Lee |
| 6,208,373 B1 | 3/2001 | Fong |
| 6,215,420 B1 | 4/2001 | Harrison |
| 6,237,846 B1 | 5/2001 | Lowell |
| 6,240,168 B1 | 5/2001 | Stanford et al. |
| 6,266,714 B1 | 7/2001 | Jacobs |
| 6,279,056 B1 | 8/2001 | Jacobs |
| 6,282,435 B1 | 8/2001 | Wagner |
| 6,346,934 B1 | 2/2002 | Wugofski |
| 6,362,440 B1 | 3/2002 | Karidis |
| 6,380,968 B1 | 4/2002 | Alexander |
| 6,390,371 B1 | 5/2002 | Armga |
| 6,417,849 B2 | 7/2002 | Lefebvre |
| 6,438,216 B1 | 8/2002 | Aktas |
| 6,438,585 B2 | 8/2002 | Mousseau |
| 6,453,027 B1 | 9/2002 | Kang |
| 6,483,905 B1 | 11/2002 | Kikinis |
| 6,484,019 B1 | 11/2002 | Aklian |
| 6,496,860 B2 | 12/2002 | Ludtke |
| 6,507,356 B1 | 1/2003 | Jackel |
| 6,513,128 B1 | 1/2003 | Wang |
| 6,516,356 B1 | 2/2003 | Belknap |
| 6,518,957 B1 | 2/2003 | Lehtinen et al. |
| 6,519,335 B1 | 2/2003 | Bushnell |
| 6,546,262 B1 | 4/2003 | Freadman |
| 6,564,270 B1 | 5/2003 | Andert |
| 6,603,855 B1 | 8/2003 | Cannon et al. |
| 6,628,194 B1 | 9/2003 | Hellebust |
| 6,628,267 B2 | 9/2003 | Karidis |
| 6,658,095 B1 | 12/2003 | Yoakum |
| 6,671,356 B2 | 12/2003 | Lewis |
| 6,671,743 B1 | 12/2003 | Verity |
| 6,674,457 B1 | 1/2004 | Davies |
| 6,680,845 B2 | 1/2004 | Agata |
| 6,690,778 B2 | 2/2004 | Kahn |
| 6,691,233 B1 | 2/2004 | Gannage |
| 6,718,183 B1 | 4/2004 | Blust |
| 6,731,316 B2 | 5/2004 | Herigstad |
| 6,732,365 B2 | 5/2004 | Belknap |
| 6,741,232 B1 | 5/2004 | Siedlikowski |
| 6,757,372 B1 | 6/2004 | Dunlap |
| 6,806,867 B1 | 10/2004 | Arruda |
| 6,816,881 B1 | 11/2004 | Mohindra |
| 6,819,961 B2 | 11/2004 | Jacobs |
| 6,831,657 B2 | 12/2004 | Tsutsumi |
| 6,882,326 B2 | 4/2005 | Hirayama et al. |
| 6,888,562 B2 | 5/2005 | Rambo |
| 6,892,074 B2 | 5/2005 | Tarkiainen |
| 6,897,851 B2 | 5/2005 | Carini |
| 6,902,332 B2 | 6/2005 | McLoone |
| 6,912,283 B2 | 6/2005 | Meyerson |
| 6,918,123 B1 | 7/2005 | Shteyn |
| 6,931,007 B2 | 8/2005 | Jones |
| 6,937,950 B2 | 8/2005 | Cragun |
| 6,938,174 B2 | 8/2005 | LeKuch |
| 6,950,119 B2 | 9/2005 | Kakii |
| 6,952,830 B2 | 10/2005 | Madineni |
| 6,954,696 B2 | 10/2005 | Ihara |
| 6,970,556 B2 | 11/2005 | Wall |
| 6,973,167 B2 | 12/2005 | Kikinis |
| 6,976,216 B1 | 12/2005 | Peskin |
| 6,978,439 B2 | 12/2005 | Kelley |
| 6,980,641 B1 | 12/2005 | Stanford |
| 6,996,445 B1 | 2/2006 | Kamijo |
| 7,000,237 B1 | 2/2006 | Sinha |
| 7,036,110 B2 | 4/2006 | Jeyaraman |
| 7,085,814 B1 | 8/2006 | Gandhi |
| 7,096,391 B2 | 8/2006 | Johnson |
| 7,106,472 B2 | 9/2006 | Gomez |
| 7,123,370 B2 | 10/2006 | Watanabe |
| 7,194,611 B2 | 3/2007 | Bear et al. |
| 7,209,133 B2 | 4/2007 | Eglit |
| 7,216,221 B2 | 5/2007 | Bear |
| 7,227,511 B2 | 6/2007 | Adan |
| 7,231,229 B1 | 6/2007 | Hawkins |
| 7,243,130 B2 | 7/2007 | Horvitz |
| 7,272,660 B1 | 9/2007 | Powers |
| 7,292,588 B2 | 11/2007 | Milley |
| 7,302,637 B1 | 11/2007 | Maguire |
| 7,372,371 B2 | 5/2008 | Bear |
| 7,401,053 B2 | 7/2008 | Kamimura |
| 7,424,740 B2 | 9/2008 | Bear |
| 7,440,556 B2 | 10/2008 | Bear |
| 7,443,971 B2 | 10/2008 | Bear |
| 2001/0034251 A1 | 10/2001 | Goto |
| 2001/0040551 A1 | 11/2001 | Yates |
| 2002/0004855 A1 | 1/2002 | Cox |
| 2002/0015020 A1 | 2/2002 | Mobin |
| 2002/0019812 A1 | 2/2002 | Board |
| 2002/0080967 A1 | 6/2002 | Abdo |
| 2002/0087225 A1 | 7/2002 | Howard |
| 2002/0099456 A1 | 7/2002 | McLean |
| 2002/0114430 A1 | 8/2002 | Murata |
| 2002/0131072 A1 | 9/2002 | Jackson |
| 2002/0144191 A1 | 10/2002 | Lin |
| 2002/0167458 A1 | 11/2002 | Baudisch |
| 2002/0167460 A1 | 11/2002 | Baudisch |
| 2003/0025674 A1 | 2/2003 | Watanabe |
| 2003/0046448 A1 | 3/2003 | Fischer |
| 2003/0074590 A1 | 4/2003 | Fogle |
| 2003/0112325 A1 | 6/2003 | Boyden |
| 2003/0118003 A1 | 6/2003 | Geck |
| 2003/0122874 A1 | 7/2003 | Dieberger |
| 2003/0146903 A1 | 8/2003 | Yi |
| 2003/0188041 A1 | 10/2003 | Fillmore |
| 2003/0197685 A1 | 10/2003 | Yi |
| 2004/0027375 A1 | 2/2004 | Ellis |
| 2004/0103144 A1 | 5/2004 | Sallam |
| 2004/0135819 A1 | 7/2004 | Maa |
| 2004/0141012 A1 | 7/2004 | Tootill |
| 2004/0155956 A1 | 8/2004 | Libbey |
| 2004/0177361 A1 | 9/2004 | Bernhard |
| 2004/0210628 A1 | 10/2004 | Inkinen |
| 2004/0222978 A1 | 11/2004 | Bear |
| 2004/0223058 A1 | 11/2004 | Richter |
| 2004/0223061 A1 | 11/2004 | Bear |
| 2004/0225502 A1 | 11/2004 | Bear |
| 2004/0240167 A1 | 12/2004 | Ledbetter |
| 2004/0240650 A1 | 12/2004 | Bear |
| 2005/0005067 A1 | 1/2005 | Culter |

| | | |
|---|---|---|
| 2005/0068423 A1 | 3/2005 | Bear |
| 2005/0182822 A1 | 8/2005 | Daniel |
| 2005/0186942 A1 | 8/2005 | Griffen |
| 2005/0193396 A1 | 9/2005 | Stafford-Fraser |
| 2005/0259032 A1 | 11/2005 | Morris |
| 2005/0262302 A1* | 11/2005 | Fuller et al. .................. 711/119 |
| 2006/0048062 A1 | 3/2006 | Adamson |
| 2006/0061516 A1 | 3/2006 | Campbell |
| 2006/0095525 A1 | 5/2006 | Mousseau |
| 2006/0100978 A1 | 5/2006 | Heller |
| 2006/0130072 A1 | 6/2006 | Rhote |
| 2006/0130075 A1 | 6/2006 | Rhoten |
| 2006/0164324 A1 | 7/2006 | Polivy |
| 2006/0176271 A1 | 8/2006 | Polivy |
| 2006/0242590 A1 | 10/2006 | Polivy |
| 2006/0284787 A1 | 12/2006 | Bear |
| 2007/0071257 A1 | 3/2007 | Bear |
| 2007/0150719 A1 | 6/2007 | Bear |
| 2008/0037741 A1 | 2/2008 | Bear |

FOREIGN PATENT DOCUMENTS

| | | |
|---|---|---|
| EP | 0777394 A1 | 6/1997 |
| EP | 00816990 | 1/1998 |
| EP | 0838934 A1 | 4/1998 |
| EP | 0772327 A3 | 2/1999 |
| WO | WO9602049 A1 | 1/1996 |
| WO | WO/01/69387 | 9/2001 |
| WO | 03/085960 | 10/2003 |

OTHER PUBLICATIONS

U.S. Appl. No. 11/509,437, filed Aug. 23, 2006, Bear.
Oxford on-line dictionary, http://dictionary.oed.com/entrance.dtl, Oxford University Press 2007, on the definition of the word "physical" under III/7b.
Office Action mailed Aug. 8, 2007 cited in U.S. Appl. No. 10/996,371.
Office Action mailed Jul. 31, 2007 cited in U.S. Appl. No. 10/677,084.
Office Action mailed Jul. 27, 2007 cited in U.S. Appl. No. 10/996,557.
Office Action mailed Jul. 30, 2007 cited in U.S. Appl. No. 10/430,369.
Office Action mailed Jul. 6, 2007 cited in U.S. Appl. No. 10/429,943.
Notice of Allowance mailed Sep. 7, 2007 cited in U.S. Appl. No. 10/429,931.
Office Action mailed Sep. 24, 2007 Cited in U.S. Appl. No. 10/429,933.
Office Action mailed Feb. 15, 2008 Cited in U.S. Appl. No. 10/429,933.
Notice of Allowance mailed Jan. 30, 2008 cited in U.S. Appl. No. 10/429,931.
Office Action mailed Mar. 21, 2008 cited in U.S. Appl. No. 10/966,557.
Office Action mailed Feb. 28, 2008 cited U.S. Appl. No. 10/996,371.
Office Action mailed Sep. 28, 2007 cited in U.S. Appl. No. 10/429,943.
Office Action mailed Mar. 26, 2008 cited in related U.S. Appl. No. 10/429,943.
Office Action mailed Mar. 18, 2008 cited in U.S. Appl. No. 10/677,118.
Office Action mailed Oct. 15, 2007 cited in U.S. Appl. No. 10/429,903.
Notice of Allowance mailed Apr. 24, 2008 cited in related U.S. Appl. No. 10/429,903.
Notice of Allowance mailed Apr. 23, 2008 cited in U.S. Appl. No. 10/430,369.
Office Action mailed Jan. 11, 2008 cited in U.S. Appl. No. 10/677,084.
Notice of Allowance mailed Apr. 29, 2008 cited in U.S. Appl. No. 10/677,084.
Office Action dated May 15, 2008 cited in U.S. Appl. No. 11/837,302.
Office Action dated Aug. 6, 2008 cited in U.S. Appl. No. 10/429,943.
Office Action dated Aug. 20, 2006 cited in U.S. Appl. No. 10/429,933.
Office Action dated Feb. 14, 2007 cited in U.S. Appl. No. 10/429,905.
Office Action dated May 21, 2007 cited in U.S. Appl. No. 10/429,905.
Office Action dated Apr. 4, 2006 cited in U.S. Appl. No. 10/429,930.
Office Action dated Jul. 14, 2006 cited in U.S. Appl. No. 10/429,930.
Office Action dated Nov. 14, 2006 cited in U.S. Appl. No. 10/429,930.
Notice of Allowance dated Mar. 16, 2007 cited in U.S. Appl. No. 10/429,930.
Office Action dated Aug. 9, 2005 cited in U.S. Appl. No. 10/429,932.
Office Action dated Oct. 4, 2005 cited in U.S. Appl. No. 10/429,932.
Office Action dated Mar. 17, 2006 cited in U.S. Appl. No. 10/429,932.
Office Action dated Aug. 15, 2006 cited in U.S. Appl. No. 10/429,932.
Notice of Allowance dated Jan. 25, 2007 cited in U.S. Appl. No. 10/429,932.
Office Action dated Mar. 16, 2006 cited in U.S. Appl. No. 10/677,101.
Office Action dated Sep. 6, 2006 cited in U.S. Appl. No. 10/677,101.
Notice of Allowance dated Feb. 2, 2006 cited in U.S. Appl. No. 10/677,101.
Office Action dated Mar. 26, 2007 cited in U.S. Appl. No. 10/429,931.
Office Action dated Sep. 26, 2006 cited in U.S. Appl. No. 10/430,369.
Office Action dated Mar. 20, 2007 cited in U.S. Appl. No. 10/430,369.
Office Action dated Jan. 3, 2007 cited in U.S. Appl. No. 10/429,903.
Office Action dated Feb. 6, 2007 cited in U.S. Appl. No. 10/429,943.
Office Action dated Jul. 6, 2007 cited in U.S. Appl. No. 10/429,943.
Office Action dated Mar. 6, 2007 cited in U.S. Appl. No. 10/429,933.
Office Action dated Aug. 10, 2005 cited in U.S. Appl. No. 10/677,084.
Office Action dated Jan. 19, 2006 cited in U.S. Appl. No. 10/677,084.
Office Action dated Nov. 1, 2006 cited in U.S. Appl. No. 10/677,084.
Office Action dated Oct. 15, 2008 cited in U.S. Appl. No. 11/509,437.
Office Action dated Oct. 17, 2008 cited in U.S. Appl. No. 11/509,431.
Office Action dated Nov. 6, 2008 cited in U.S. Appl. No. 10/996,557.
Office Action dated Oct. 1, 2008 cited in U.S. Appl. No. 10/996,371.
Office Action dated Nov. 28, 2008 cited in U.S. Appl. No. 10/677,118.
Office Action dated Jan. 2, 2009 cited in U.S. Appl. No. 11/837,302.
Notice of Allowance dated Feb. 6, 2009 cited in U.S. Appl. No. 10/429,943.
Office Action dated Feb. 20, 2009 cited in U.S. Appl. No. 11/053,186.
Notice of Allowance dated Mar. 19, 2009 cited in U.S. Appl. No. 10/677,118.
Notice of Allowance dated Mar. 24, 2009 cited in U.S. Appl. No. 11/837,302.
Office Action dated Apr. 3, 2009 cited in U.S. Appl. No. 11/685,014.
Office Action dated Nov. 5, 2008 cited in U.S. Appl. No. 10/996,634.
Notice of Allowance dated Mar. 30, 2009 cited in U.S. Appl. No. 10/996,634.
Notice of Allowance dated Apr. 6, 2009 cited in U.S. Appl. No. 10/429,943.
Office Action dated Apr. 15, 2009 cited in U.S. Appl. No. 11/509,437.
Notice of Allowance dated Apr. 16, 2009 cited in U.S. Appl. No. 10/996,371.
Office Action dated Apr. 24, 2009 cited in U.S. Appl. No. 11/509,431.
Office Action dated May 12, 2009 cited in U.S. Appl. No. 11/112,456.
Notice of Allowance dated Jul. 21, 2009 cited in U.S. Appl. No. 11/685,014.
Office Action dated Sep. 2, 2009 cited in U.S. Appl. No. 11/053,186.
Office Action dated Sep. 15, 2009 cited in U.S. Appl. No. 11/509,437.
Office Action dated Sep. 25, 2009 cited in U.S. Appl. No. 11/509,431.
Notice of Allowance dated Oct. 5, 2009 cited in U.S. Appl. No. 10/996,557.

* cited by examiner

WAKING A MAIN COMPUTER SYSTEM TO PRE-FETCH DATA FOR AN AUXILIARY COMPUTING DEVICE

FIELD OF THE INVENTION

The invention relates generally to computer systems, and more particularly to an improved system and method for communicating information between computing devices.

BACKGROUND OF THE INVENTION

U.S. patent application Ser. Nos. 10/429,930 and 10/429,932 are generally directed towards the concept of computer systems having auxiliary processing and auxiliary mechanisms that provide some auxiliary computing functionality. For example, a small LCD on the lid or side of a laptop computer can provide its owner with useful information, such as a meeting location and time, even when the main computer display is not easily visible, such as when a laptop computer's lid is closed and/or the main computer is powered down. Controls such as buttons may be provided to allow the user to interact with the auxiliary device to view different types of data, such as to view additional appointments among calendar data, read email messages, read directions, play media, and so forth.

Somewhat similar to an auxiliary LCD screen built into a mobile host computer, a mobile telephone, a music playing device, a pocket-sized personal computer, a personal digital assistant and so forth can serve as an auxiliary device to a main computer when coupled to it physically and/or via a wireless (e.g., Bluetooth or infrared) link, as long as the device is programmed to allow its display and/or other functionality to be used with data originating at the main computer system. In general, any device with I/O capabilities that can interface in virtually any way with a computer system can potentially serve as an auxiliary computing device.

One significant advantage to having an auxiliary device for a main computer system is that some information may be made available even while the main computer is fully turned off or is within one of various sleep states, (e.g., possibly those sleep states standardized by the ACPI, or Advanced Configuration and Power Interface, specification). To understand why this is advantageous, consider that when the main computer is operating, a significant amount of power is consumed. Power consumption is a significant issue when dealing with mobile personal computers such as laptops and tablet-based computing devices, because users desire long battery life between recharges. In general, the longer the PC is in a fully-powered state (e.g., corresponding to S0 in ACPI), the shorter the battery life. An auxiliary device conserves power by allowing the user to leave the main computer off when accessing certain types of information. Other benefits of auxiliary displays include rapid access to information, e.g., a laptop does not have to have its lid opened to present a user with information, exit a sleep state, spin up a disk and so forth.

However, an auxiliary device associated with a main computer that is not fully-powered is limited to operating with data cached from the last time the main computer system was on and/or any data obtained independent of the main computer system. As a result, the cached data may be stale, and/or the cached data may be insufficient for some task the user wants to perform, such as because of limited memory on the auxiliary device. What is needed is a way for an auxiliary device to access data from the main computer system, while doing so in a manner that conserves the power of the main computer system.

SUMMARY OF THE INVENTION

Briefly, the present invention provides a system and method for an auxiliary computing device to wake an associated main computer system to obtain data as needed. The need for data at the auxiliary device may be on-demand and/or in anticipation of demand. The waking of the main computer system is ordinarily temporary, whereby only a relatively small amount of power is consumed by the main computer system, e.g., an amount generally corresponding to a duty cycle of waking the main computer system to some power state that is sufficient to obtain the data.

In one implementation, signal data over a control channel between the auxiliary device and the main computer system may be used to wake the main computer system when the auxiliary device has a need for data. When the main computer system is awakened to a power state that is sufficient to obtain and send the data, a main data channel is used to request and receive the data. The main computer system then returns to a lower-power sleep state, whether by its own mechanism or as instructed by the auxiliary device. By automating the process of waking the main computer system to fetch relevant data and restoring the main computer system back into a lower power state, the auxiliary device can effectively have current data as well as have access to a much larger amount of data than the auxiliary device can locally cache.

Moreover, the complete power of the main computer system's operating system and/or application programs may be leveraged, such as to use the main computer system's digital rights management mechanisms to access protected media data. Thus, the main computer system is used to obtain the data, leveraging rather than bypassing the powerful main computer system including the operating system, programs and other components as appropriate.

In addition to fetching data that is needed, additional data may be intelligently requested by the auxiliary device while the main computer system is powered up. For example, while playing audio, the auxiliary device may wake the main computer system to receive a next set of audio tracks. At the same time, the auxiliary device may request calendar data, email data, and so forth, in a further intelligent pre-fetching operation, even though this data was not specifically needed. Such additional data already may have been scheduled for synchronization; if so, obtaining it in conjunction with a need-based demand for other data can reset the next scheduled time, thereby further reducing power consumption.

Other advantages will become apparent from the following detailed description when taken in conjunction with the drawings, in which:

DETAILED DESCRIPTION

Exemplary Operating Environment

Figure 1:
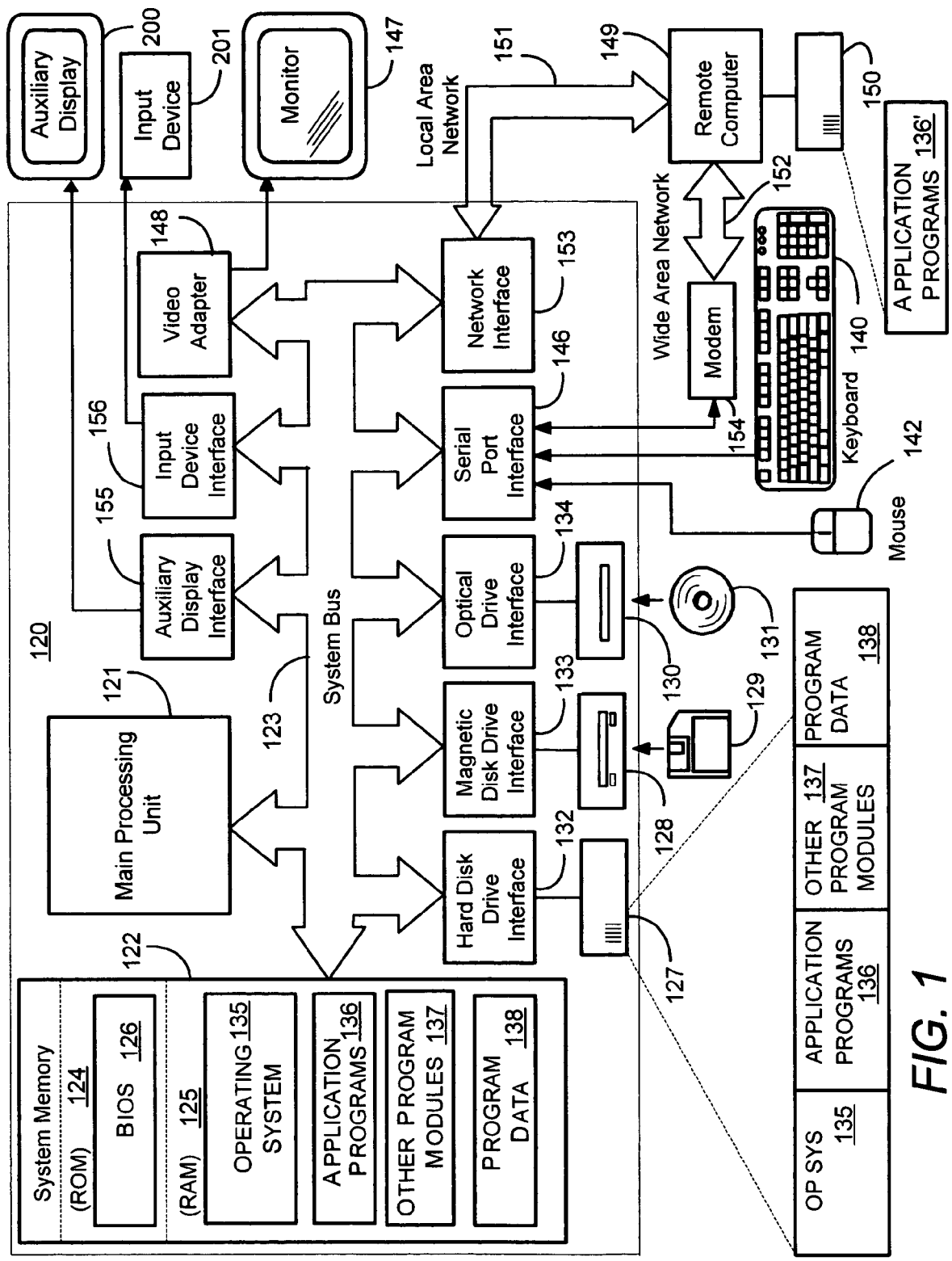
FIG. 1 is a block diagram representing a general purpose computing device in the form of a conventional personal computer system into which the present invention may be incorporated.

FIG. 1 is a block diagram representing a computing device 120 in the form of a main personal computer system into which the present invention may be incorporated. Those skilled in the art will appreciate that the personal computer system 120 depicted in FIG. 1 is intended to be merely illustrative and that the present invention may be practiced with other computer system configurations, including hand-held devices, multi-processor systems, microprocessor-based or programmable consumer electronics, network PCs, minicomputers, mainframe computers, headless servers and the like. The invention may also be practiced in distributed computing environments where tasks are performed by remote processing devices that are linked through a communications network. In a distributed computing environment, program modules may be located in both local and remote memory storage devices.

The personal computer system 120 included a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124. The personal computer 120 may further include a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120. Although the exemplary computer system described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary computer system.

A number of program modules may be stored on the hard disk, magnetic disk 129, optical disk 131, ROM 124 or RAM 125, including an operating system 135 (such as Windows® XP), one or more application programs 136 (such as Microsoft® Outlook), other program modules 137 and program data 138. A user may enter commands and information into the personal computer 120 through input devices such as a keyboard 140 and pointing device 142. Other input devices (not shown) may include a microphone, joystick, game pad, satellite dish, scanner or the like. These and other input devices are often connected to the processing unit 121 through a serial port interface 146 that is coupled to the system bus, but may be connected by other interfaces, such as a parallel port, game port or universal serial bus (USB). A monitor 147 or other type of display device is also connected to the system bus 123 via an interface, such as a video adapter 148. In addition to the monitor 147, personal computers typically include other peripheral output devices (not shown), such as speakers and printers. An auxiliary display/device 200 is an additional output device, and may, for example, be connected to the system bus 123 via an auxiliary display interface 155.

An auxiliary display may also connect to a main computing device 120 through a serial interface or by other interfaces, such as a parallel port, game port, infrared or wireless connection, universal serial bus (USB) or other peripheral device connection. An input device 201 in FIG. 1 may provide one or more actuators to interface with and/or control the auxiliary display 200, and for example may be part of the auxiliary display device, but alternatively may be independent thereof and connected to the system bus 123 via input device interface 156, which may be a serial interface, or by other interfaces, such as a parallel port, game port, infrared or wireless connection, universal serial bus (USB) or other peripheral device connection.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, Intranets and the Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

It should be noted that the computer system need not be fully operational for an auxiliary device to work in accordance with the present invention. Indeed, an auxiliary device may still work when the computer is powered down, at least to a default extent or to an extent configured by a user, such as when the computer system is in a sleep state or a hibernate mode, and/or when the user has not yet logged on or is otherwise locked out of the system via security mechanisms.

The auxiliary display/device 200 may supplement the main display and may also serve as a surrogate display when the main display is shut down or otherwise not operational (e.g., disconnected), to give the user some information. For example, information such as how to power up the main display might be helpful, as would a room number and/or directions to a meeting on an auxiliary display device connected to a mobile computer that the user can view when the main display is off and/or not easily visible (e.g., the lid of a laptop is closed). The auxiliary device may play audio and/or video, show images, show calendar information, show emails and so forth.

To enable and control communication in these powered-down modes, firmware may exist, stored in non-volatile memory, which when loaded and operated on by a secondary processor, enables the auxiliary display, along with other auxiliary components to be used, as long as some power is available. Note that as used herein, the terms "firmware" and "device hardware" are essentially equivalent, and can be generally considered as representing the auxiliary memory, the code therein and/or the auxiliary processor on which it runs.

Figure 2A:
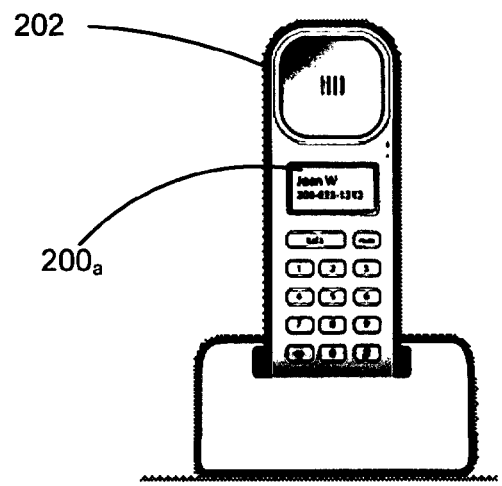
FIGS. 2A-2E are exemplary illustrations generally representing locations for placement of the auxiliary display on various devices.
Figure 2B:
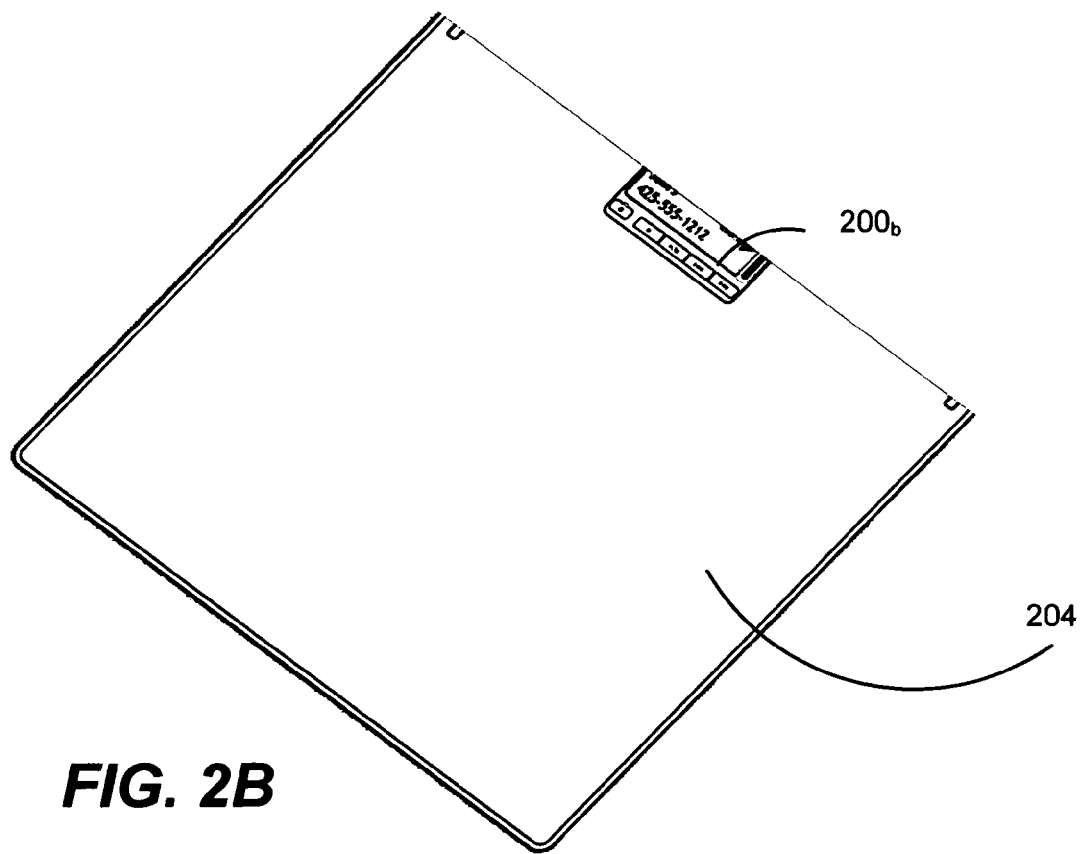
Figure 2C:
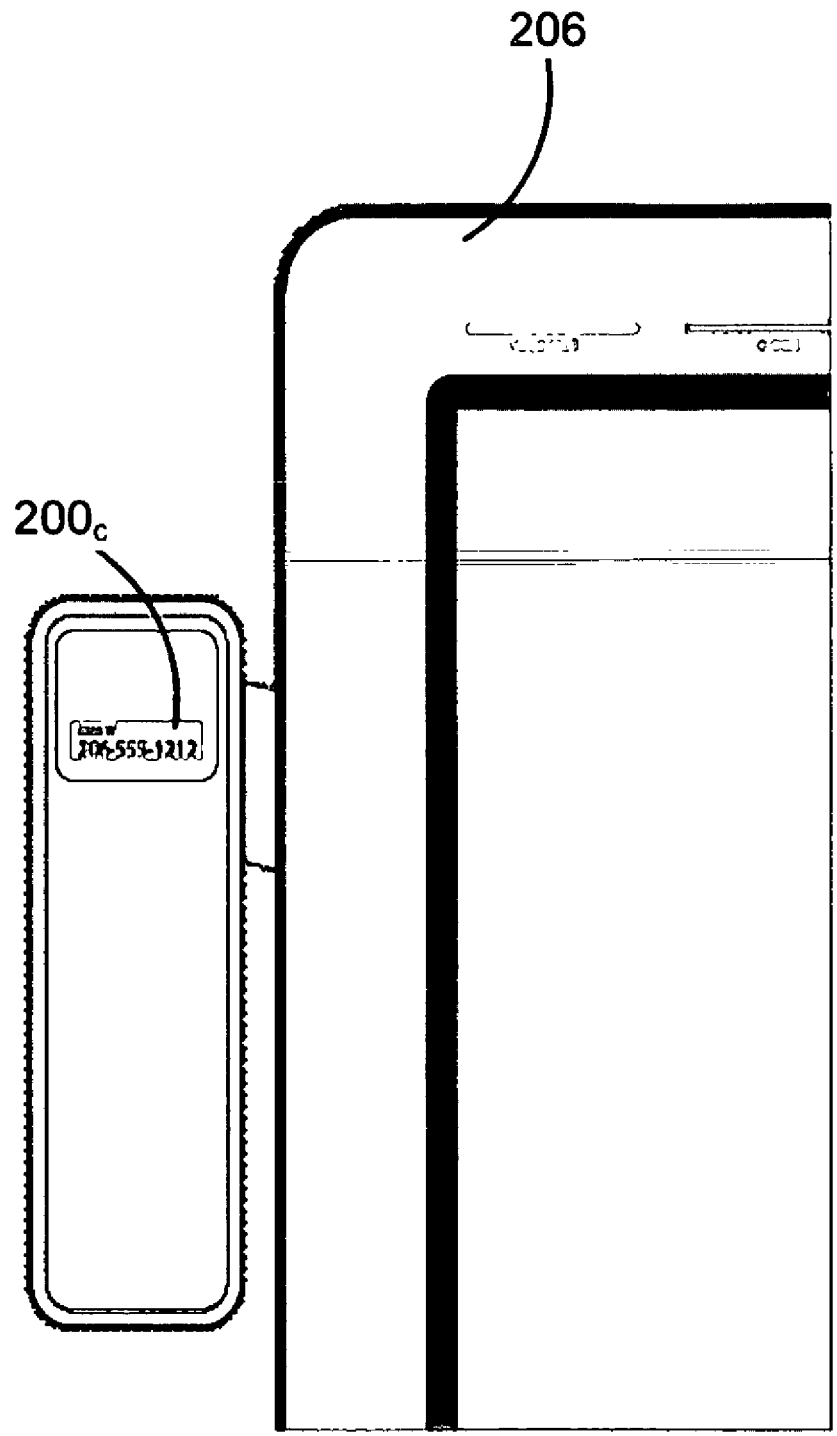
Figure 2D:
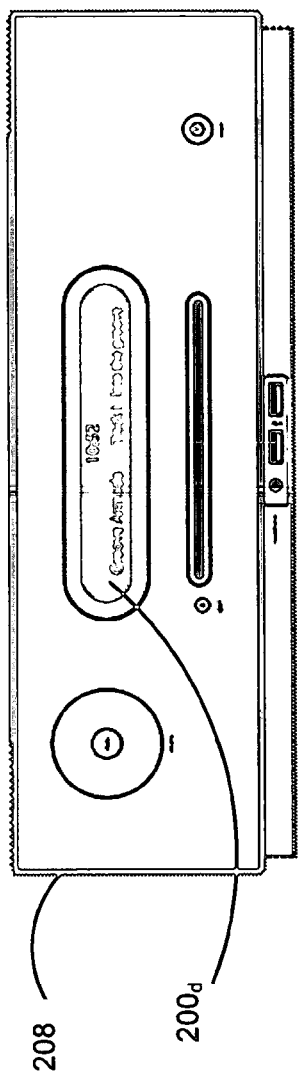
Figure 2E:
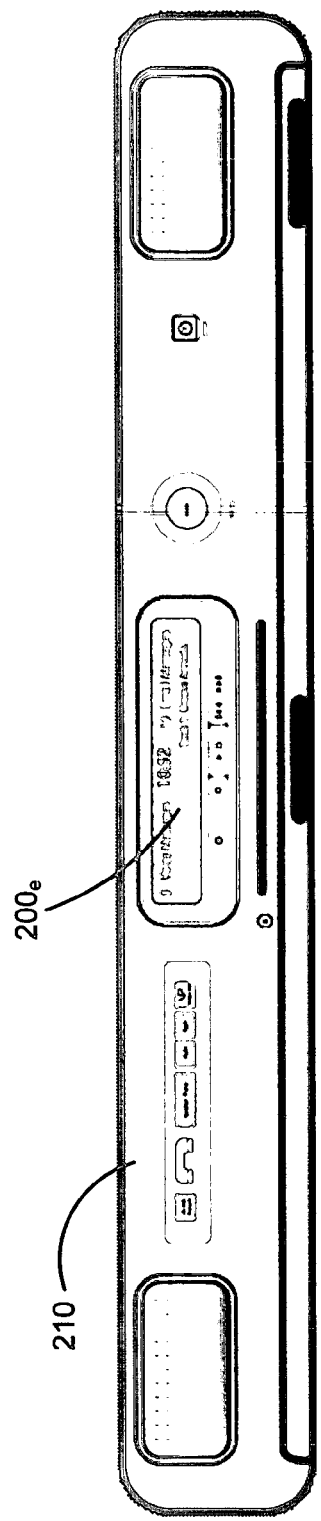
Figure 2E:
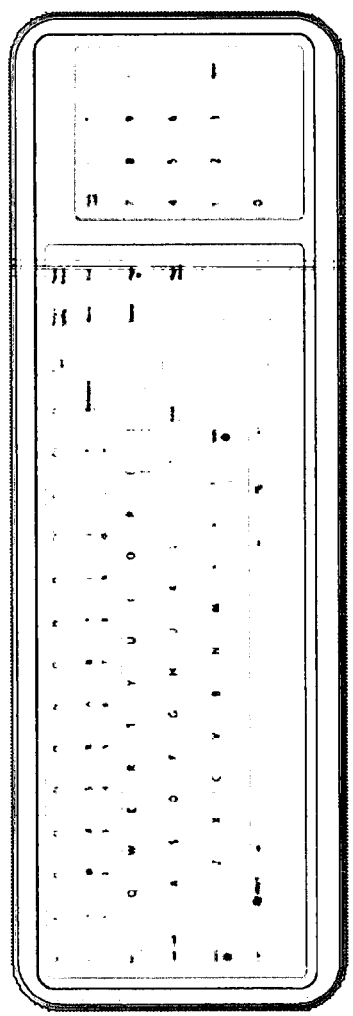

FIGS. 2A-2E illustrate exemplary locations on or associated with computing devices for placement of auxiliary display screens $200_a$-$200_e$, respectively. As represented in FIGS. 2A and 2B, an auxiliary display screen $200_a$ may be placed on the front, back or other surface of a standalone (landline or mobile) phone 202, (which need not be physically coupled if otherwise linked such as via Bluetooth technology) and/or another auxiliary display screen $200_b$ placed on the edge or lid of a mobile computer 204 or tablet computing device (not shown). Another place for an auxiliary display screen $200_c$ (FIG. 2C) may be on a phone mounted on a computer or a peripheral device attached to a computer such as on monitor 206 or on a keyboard (not shown). FIGS. 2D and 2E illustrate additional placements of auxiliary display screens $200_d$ and $200_e$ on the front panel of a standalone console 208 connected to a computer, or some other housing 210 (such as a housing for the motherboard), respectively. Those skilled in the art will appreciate that an auxiliary display screen may be placed on any surface of any computing device or other device having display capabilities, such as placed on a watch with a wireless or other connection to a computer, on a remote control device, on a remote wall-mounted unit, and so forth. Indeed, the auxiliary display need not be physically close to the main computer system, as the connection may be over a LAN or WAN, or even over the internet.

As should be apparent from FIGS. 2A-2E, an auxiliary display may be in the form of any number of known types of displays such as one or more LEDs, a 2-line alphanumeric display, a monochrome display, or a color display. Those skilled in the art will appreciate that the present invention may also use the display of other computing or communication devices as the auxiliary display 200. These other computing or communication devices include general purpose computers, cell phones, and handheld devices such as a pager or a personal digital assistant (PDA). Additionally, the present invention may use a virtual auxiliary display implemented within an area of the onscreen display of the computing device 120 (e.g. a screensaver or a component of the graphical user interface) as the auxiliary display 200, including before a user has logged in. The auxiliary display 200 may include a combination of any of the forms described above, and also be physically or logically combined with indicators such as one or more LEDs and/or used in conjunction with a virtual auxiliary display.

An auxiliary device may provide functionality even without a screen, or when its screen is powered down. For example, an auxiliary device may play audio, collect data (e.g., for later transfer back to the main computer system), perform calculations and so forth. Also, the display may comprise one or more LEDs or the like rather than a full screen. Thus, although many benefits and advantages arise from having an auxiliary display screen, and thus an auxiliary device may be referred to herein as an auxiliary display, a display is not required. In general, an auxiliary display, as referred to herein, may be composed of essentially anything that can be sensed, including any visual, audible, and/or tactile representations.

Wake to Pre-Fetch Data for an Auxiliary Device

As will be understood, the present invention provides an auxiliary device 200 for a user to simply and rapidly interact with auxiliary information. In keeping with the present invention, the main computer system (e.g., the computer system 120 of FIG. 1) to which the auxiliary device connects may be in a sleep state during such user interaction with the auxiliary device 200, such as to conserve power. Note that as used herein, a sleep state may be any state from which the computer system may be woken by the auxiliary device, which may correspond to any architecture that allows a computer system to enter a reduced power state, including, but not necessarily, an ACPI-type architecture.

In accordance with various aspects of the present invention, when additional data is needed by the auxiliary device 200, the auxiliary device 200 wakes the main computer system 120 and obtains the additional data, after which the main computer system 120 typically returns to a sleep state. Although visible data, audio program data and notifications will be used herein to illustrate the auxiliary presentation of information, it should be understood that the present invention is not limited to outputting any particular types of data. It will also be appreciated that the auxiliary display 200 may be operative using any number of known types of displays such as a set of notification lights, a 2-line alphanumeric display, a monochrome display, or a color display. Note that as used herein, for simplicity "auxiliary display device" will generally refer to the auxiliary display screen and/or the actuators associated with that screen as well as any other hardware, firmware or software in the device, however it should be understood that the screen and actuators may be independent mechanisms, and/or that there may not be actuators requiring physical contact to input data. Further, note that the auxiliary display device 200 may be considered as possibly containing indicators (e.g., individual LEDs) instead of or in addition to a pixel-type display screen.

Further, as will be understood, there are many types of devices that can serve as an auxiliary display device, including those that do not necessarily have displays but can provide some output such as a sound or light. Although a number of examples are used herein, including displays on laptop lids, mobile phones, pocket-sized personal computers, digital image-based picture frames, kitchen displays, televisions, media players, clocks including alarm clocks, watches and so forth, the present invention is not limited to any of these examples, but rather anticipates the use of any device capable of outputting sensory information, even when referred to as an auxiliary "display." For example, other types of devices include auxiliary devices embedded within or using the main display of a consumer electronics device, (such as a refrigerator, home theater receiver, DVD player, and so forth), wall displays, automotive, transportation or other vehicular units (e.g., using displays already in a car/train/plane as an auxiliary display), keyboards or other input devices of the main computer system, PDAs (including non-cellular telephone PDAs), and the like.

Similarly, the present invention is not limited to any particular mechanism for coupling the auxiliary display to another computer system, and thus is not limited to the wired or wireless examples used herein. The connection may be relatively close or relatively distant, essentially anywhere, such as a virtual private connection over the Internet.

Figure 3:
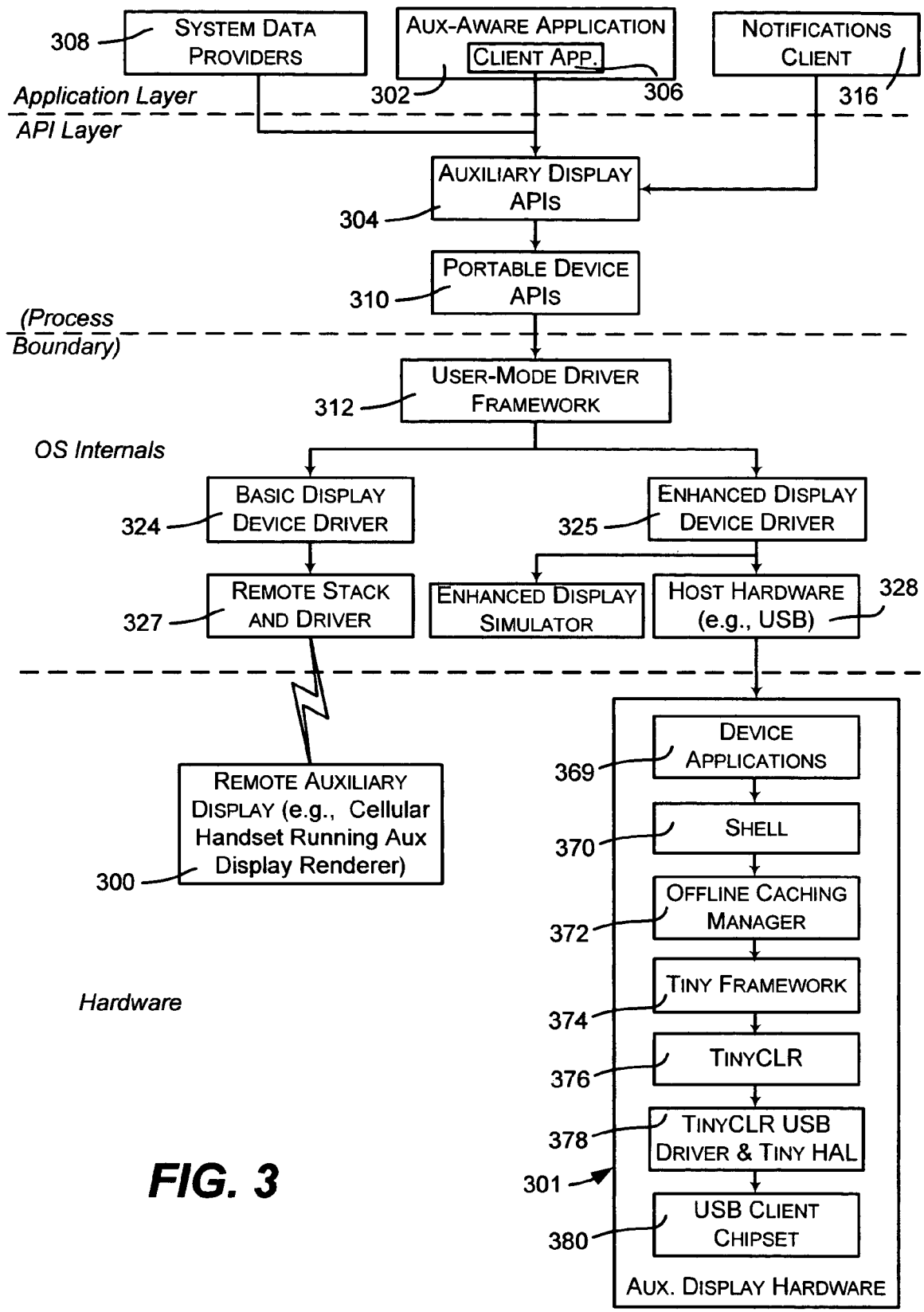
FIG. 3 is a block diagram generally representing an example layered architecture by which application programs can exchange data with the firmware of an arbitrary auxiliary display device in accordance with an aspect of the present invention.

Turning to FIG. 3 of the drawings, there is shown an example implementation that exposes auxiliary devices 300 and/or 301 to clients comprising application programs 302 and other programs (e.g., operating system components) running on the main computer system (e.g., 120), via an auxiliary display API set 304. The API set 304 provides APIs for various functions, including registering a client application 306 (a component of the program or possibly the program itself) with the system, sending content to the attached devices, sending notifications to the attached devices, and receiving events from the attached devices. Events may include navigation events, content request events, content change events, and so forth.

In keeping with an aspect of the present invention, the use of the API set 304 exposes only an "auxiliary display system" to the clients; there is no direct access to individual devices. As a result, for an independent software vendor, after registering a program component as a client application 306 (via the API set 304), content may be sent to any auxiliary device using another call to the same API set 304, regardless of the device's actual type and capabilities. Although the user experience may differ, the program need not adapt to the auxiliary device that is present. Note that while an application program can obtain capability information about the auxiliary device, and may choose to act differently based on the capabilities, the application program need not do so in order to use the device. This is because the architecture handles further communications, freeing the application program from complex tasks including tailoring data to any particular device.

The API layer 304 is written on a portable device API set 310, which communicates with the device's driver process via user-mode driver framework 312. The portable device API set 310 maps the auxiliary display into a category of portable devices and it allows enumeration of the device's capabilities. This is encapsulated within the user-mode driver, however, and not necessarily exposed to the client application 306.

In general, the client application 306 sends notifications directly to the auxiliary device 300 (and/or device 301). The auxiliary device is capable of displaying notifications, as well as generating its own notifications based on the data provided from the main computer system. Other (optional) components shown in FIG. 3 include a notifications client 316 that can provide notifications on the auxiliary display. For example, even when an application program such as a calendar program is not running, it may be desirable to provide scheduled notifications corresponding to that program; the notifications client 316 enables such scenarios. The auxiliary device can also cache and output notifications independent of the state of the main computer system. Note that in general, the components below the application layer and above the device drivers 324 and 325 may be generally referred to as the "auxiliary display platform."

In general, each auxiliary device vendor provides a corresponding auxiliary device driver 324, although if the device is built in a certain way, the device driver may be supplied by the provider of the auxiliary display platform. More particularly, as described below, certain types of auxiliary devices are considered "enhanced" devices because they are configured with certain firmware that among other things is generally compatible with any information that can be received via the API set 304. For such devices, the device driver 325 may be generic, (and thus may be provided by the auxiliary display platform provider), generally operating to perform some straightforward tasks, such as to convert the API-received information to a proprietary format understood by the auxiliary device firmware. For other auxiliary devices, referred to herein as "basic" devices, the driver needs to be compatible with the device's capabilities, and thus the auxiliary device vendor needs to provide a driver customized to that device or class of devices.

In any event, the user mode driver framework provides a device driver interface (DDI) for coupling device drivers (e.g., 324 and 325) to the auxiliary display platform. The drivers then forward (and return) data corresponding to the API-received information to an appropriate hardware interface (transport) for communication to the auxiliary display device. For example, in FIG. 3, the basic device driver 324 is shown as forwarding data (via a previously defined protocol) to the remote stack and driver 327 for wireless (e.g., Bluetooth, Wi-FI, AM/FM infrared and so forth) communication to the device 300, whereas the enhanced device driver 325 is shown as forwarding data to USB-based hardware 328, although other types of transports including network transports such as TCP/IP-based transports are feasible. Note that a user-mode driver may work for all enhanced displays, regardless of connection type, however it is likely more straightforward to use one driver per device per connection type. As is understood, these connections are only shown for example purposes, as any device driver will forward (and return) data for wireless or wired communication as appropriate.

Further note that as represented in FIG. 3, multiple devices may be coupled to a computer to serve as an auxiliary display at the same time. A user may configure (e.g., via a control panel or the like of system data providers 308) which client application's data is displayed on which devices. The system data provider 308 also supplies system information such as time data, wireless signal strength data, the computer's audio volume and mute state and/or battery level data to auxiliary displays. In one implementation, the auxiliary display platform consults a system-maintained matrix whenever a client application 306 sends content, to determine which device or devices are to receive the information. Some translation of content for different device types may occur at this level, as well as possibly at other levels above the device driver level and in the device driver, as described below. The API of the auxiliary display platform will also send events and the like from auxiliary devices to the application client application, again using the matrix to route the events back to the client application (or client applications) as appropriate.

As also shown in FIG. 3, an "enhanced" display 301 is one that runs a particular firmware stack referred to herein as the auxiliary display platform. For example, in one present implementation, such a firmware stack includes a TinyCLR component and supports TinyCLR object serialization.

In the example implementation represented in FIG. 3, to navigate and display cached content, device applications 369 and a shell program 370 run on a TinyCLR framework 374 and component 376, which interprets, navigates, and displays the data. In general, the shell program 370 provides a home page, a non-client area (an area on the device's screen which is always visible when the display is on no matter what other content is being displayed on the device, typically used to display commonly needed things, such as a clock, a battery indicator, a network indicator), menus and the general look and feel of the auxiliary display device. The data provided may be in the form of or modified into a directed graph of screens, each of which is a visual tree of TinyCLR View objects rooted by a TinyCLR Form object. The shell layer receives button events from the lower layers of the firmware, interprets them, and navigates around in the data as appropriate. The shell program 370 also accepts notification requests from the main computer system via the auxiliary display platform as described above, and issues requests to the main computer system to provide new content when it learns from the caching manager 372 that content is needed (e.g., missing). The shell program 370 also displays timed notifications, which can occur when the main computer system is not connected. Note that the rendering engine 370 is extensible such that an application may provide custom code, in the form of a device application 369, that is capable of rendering that application's data.

The offline caching manager 372 comprises an assembly, written on top of the TinyCLR 376, which manages the cache of data items stored on the device. This component also performs some memory management, dealing with the fact that system application programs may provide more data than the device can store. If the firmware modifies the data cache, this component tracks that information, and posts events to the application program on the system to let it know either immediately if the main computer system is online, or if not online, when the machine comes back online. The cache manager 372 may be exposed to the driver 360 via an interface.

Figure 4:
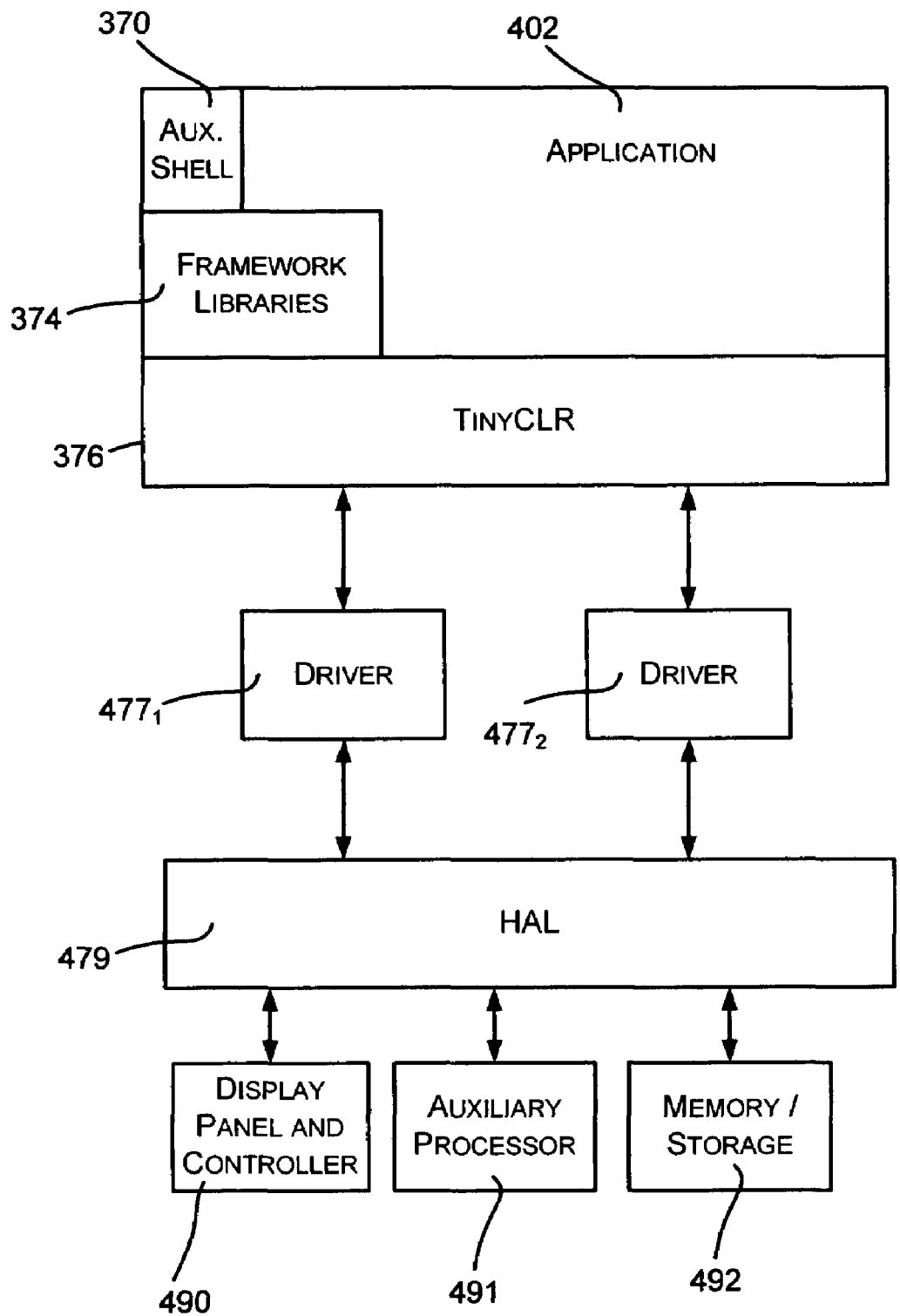
FIG. 4 is a block diagram generally representing an example architecture showing an auxiliary display platform, and device firmware/hardware, and constructed in accordance with an aspect of the present invention

FIG. 4 shows the device firmware and hardware including the display panel and controller 490, auxiliary processor 491 and memory 492. Note that manufacturers may add other components. Above the hardware components, a HAL 479 (i.e., a hardware abstraction layer) allows the higher-level code to be written in a hardware-independent manner. As used herein, the terms "high-level" and "low-level," "above" and "below" and the like when referring to a code stack are similar to those used in other computing scenarios, wherein in general, the lower a software component is relative to higher components, the closer the lower component is to the hardware. FIG. 4 generally corresponds to much of the firmware stack of FIG. 3, except for example that the separate HAL 479 and one of the drivers $477_1$-$477_2$ of FIG. 4 are shown together as the component 378 in FIG. 3, and another application program 400 is also shown in FIG. 4.

Above the HAL are drivers $477_1$-$477_2$, although there may be more (or fewer) drivers. Above the drivers, other device software includes the common language runtime (CLR), such as the TinyCLR 376, which comprises a relatively smaller scale implementation of the NET common language runtime environment. Managed code that runs on the common language runtime will run on whatever platform the common language runtime runs on, which is made possible by the HAL (hardware abstraction layer) for that platform, e.g., a HAL for a platform based on an ARM7 chip. Because the majority of the firmware is written in managed code, it is also independent of the type of hardware on which it runs. By controlling a majority of the device firmware and including the HAL and CLR in the architecture, device manufacturers may reuse existing software without any change, which is important to provide a high quality, consistent experience between various types of devices that serve as auxiliary displays.

The application program 402 may be an application program that works with cached data. Certain applications that cannot be written in managed code, such as for performance reasons, can be written in native code such as C or C++ and essentially extend the CLR. For example, high-speed media buffering may not be able to be accomplished fast enough if copied from application program-level buffers through the CLR to lower-level digital signal processing buffers. To avoid such a copying expense, native code in the CLR may fill a single set of buffers. The auxiliary shell program 370 and framework libraries 374 are also shown in FIG. 4.

As described herein, content may be thus downloaded to a cache on the auxiliary device, and the auxiliary device itself will then handle the content as desired. Note that this allows for disconnected usage, as well as having multiple applications running on the system provide content, generally with one application being run at a time to access the cached content on the auxiliary display.

In accordance with various aspects of the present invention, to conserve power, the main computer system 120 may be maintained in a reduced-power sleep state, and only awakened as needed to supply an auxiliary device (e.g., the device 301) with data. Note that the auxiliary device 301 may have an independent power source, or may share the same power supply with the main computer system, such as in the scenario of an LCD auxiliary display built into the lid of a laptop computer. Regardless, even if shared, the auxiliary device 301 typically consumes far less power than the main computer system 120 does when entered into a sleep state, e.g., a state in which most of the main computer system's component devices are shut down. The awakening of the main computer system 120 only when needed by the auxiliary device 301 results in significantly less power being consumed than when those component devices are operational.

In one implementation, the auxiliary architecture generally described above with reference to FIGS. 3 and 4 may be used to enable the auxiliary device 301 to remain operational when the main computer system's CPU/operating system and application programs are in a sleep state. To prepare for such separate operation, when awakened and connected to the auxiliary display 301, the main computer's operating system and application programs may prepare a data cache and other information that is then transferred to auxiliary storage 492 (FIG. 4) for use when the main computer system 120 is in a sleep state. The transferred data may be compressed to reduce its size, which may be particularly valuable when the connection has a limited bandwidth. Note that while completely independent operation is possible in other examples, in the present examples described herein, the main computer system 120 and auxiliary device 301 remain connected (or at least sometimes reconnect) in accordance with various aspects of the present invention. Thus, sometime after filling the cache, the main computer system 120 enters a sleep state.

Via the cached data, the auxiliary device 301 may perform auxiliary computing functionality while the main computer system 120 is in a sleep state. At some later time, the auxiliary computer system 301 may need more information than is currently cached. A typical example is when the auxiliary device is processing relatively large amounts of data rapidly, such as when playing media from a relatively limited-size cache. However other typical examples include handling a request for even small amounts of data that are not cached on the auxiliary device for whatever reason, such as updated calendar data, the next email message, and so forth.

Figure 5:
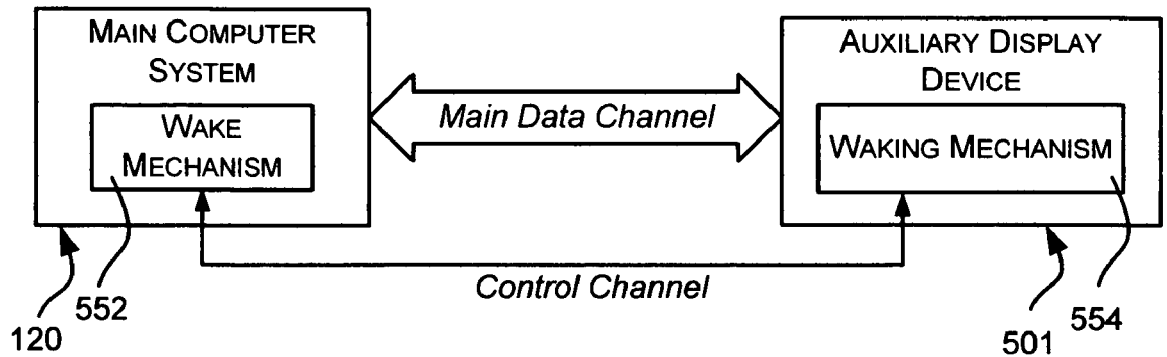
FIGS. 5 and 6 are representations of how in alternative example implementations, an auxiliary-aware device wakes a main computer system, in accordance with an aspect of the present invention.
Figure 6:
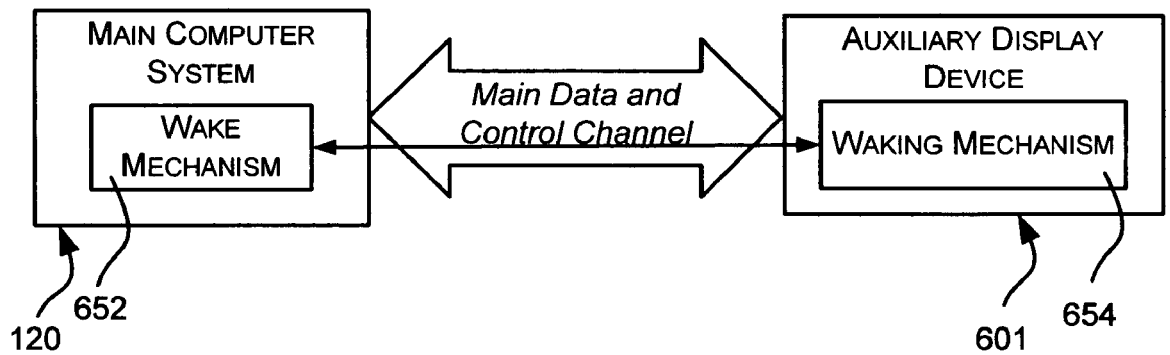

In accordance with the present invention, when such a data need occurs, the auxiliary device 301 wakes the main computer system 120. To this end, and as generally represented in FIGS. 5 and 6, the auxiliary device (e.g., 501 or 601) is coupled to the main computer system 120 in a manner that allows the auxiliary device 301 to wake the main computer system 120 to some operational state in which requested data can be communicated to the auxiliary device for caching. As can be readily appreciated, the auxiliary device may also waken the main computer system 120 to transfer data to it, that is, primarily in the other direction, such if the auxiliary device is storing data on the main computer system, (which may be desirable if received from another source such as a network connection to the auxiliary device).

Note that the request for data to refill (some or all of) the cache may not be based on an actual need, but rather an anticipated need, and that the request may be for more data than is actually needed. For example, a stream of audio data may be requested well in advance of the time that the audio data is actually going to be processed into output audio, that is, to buffer the data in advance to provide uninterrupted audio. Similarly, if a user requests calendar data or an email message, other data close to the requested data (e.g., calendar data around the requested date, emails received around the same time, and so forth) may be requested in anticipation of likely demand. A similar timestamp is not the only criterion for anticipating demand, e.g., the user may be filtering email messages or calendar by some other criterion such as the sender identity, and intelligent pre-fetching can obtain those sender's emails. Those skilled in the art will recognize that any caching algorithm/mechanism may be used, and the present invention is not limited to any particular way or ways to cache data, including any exemplified herein.

In one implementation generally represented in FIG. 5, when more data is needed, one way for an auxiliary device (labeled 501 in this example) to wake a main computer system 120 is via a control channel that couples a wake mechanism 552 in the main computer system 120 to a waking mechanism 554 in the auxiliary device 501. As represented in FIG. 5, the control channel may be separate from a communication channel over which the requested data will be sent.

By way of example, when a close physical connection exists, an SMBUS (already used for wake events such as opening the laptop's lid) may be coupled to the auxiliary device 501 as the control channel via which the auxiliary device in general may control the sleep state of the main computer system 120. An advantage to using SMBUS is that with contemporary main computing architectures based on ACPI, the wake mechanism 552 is already built into the main computer system 120, by which the sleep state may be controlled, including to place the main computer system 120 into a sleep state in which most of the components such as a network card, modem, USB controller and so forth are powered down. A disadvantage to this solution is that some physical connection to SMBUS is required, which does not work well with many types of auxiliary display devices that are designed to couple and decouple from the computer system for remote usage, such as mobile telephones, remote audio players and digital picture frames; this is the situation whether coupled by wired protocols (e.g., USB devices and so forth) or wireless protocols (e.g., Bluetooth, AM/FM, 802.11 or 802.16, infrared and so forth).

For such separable devices, another way to communicate wakeup information to the main computer system's wake mechanism is provided. This may be wireless or wired, and/or over the same connection that serves as the main data channel. In other words, the control channel to the wake mechanism may be separate from the data channel, but may be over the same type of connection. FIG. 6 represents a main data channel and control channel sharing a connection type.

For example, a USB connection, Bluetooth connection, telephone connection, infrared signal, relevant network activity and so forth may be used to wake the main computer system, independent of whether the wake connection (control channel) was also the same connection used as the main data channel used to communicate data between the main computer system 120 and the auxiliary device (labeled 601 in this example). Note that if one of these mechanisms is used for the control channel with current ACPI-based architectures, the main computer cannot be put into a sleep state that would turn off the control channel, e.g., the USB controller, Bluetooth radio, network card and/or modem, as appropriate. Notwithstanding, the present invention still saves power in such a scenario, and moreover, is not limited to any contemporary (e.g., ACPI-based) architecture with respect to its sleep states; computing architectures likely will be extended to allow other types of wake mechanisms.

For example, a main computer system architecture may be configured (including by the user) to enter a sleep state in which the wake mechanism was the only component consuming power, yet could be woken by a (e.g., non-SMBUS) signal to in turn wake the entire machine. Note that even though the control channel may not be SMBUS, the wake mechanism may receive such wake-related signals and then use a connection to SMBUS to wake the machine. Further, an auxiliary device may wake its main computer system even if not previously coupled to it when the main computer system went to sleep, as long as the control channel is operational and the wake mechanism is on (or can be powered such as by proximity sensing). A self-powered mechanism such as a radio that wakes up or remains in a very low power state (such as a low-powered Bluetooth stack waiting to detect an auxiliary device), may be used to wake the machine, as may having a low-powered controller that detects a physical coupling of an auxiliary device to the main computer system.

In any event, when the main computer system is awake, the needed data is communicated over the data channel to the auxiliary device, (or vice-versa). For data requested by the auxiliary device, as much data as needed may be cached, plus possibly more when smart caching is used to anticipate need.

Another aspect of the present invention is that the auxiliary device may leverage the full capabilities of the main computer system when awake. For example, the auxiliary device (e.g., 301) need not have its own hard drive to control relatively large amounts of data, but rather may use the main computer system's hard drive as needed. Further, the auxiliary display 301 may use the full digital rights management components of the main computer system 120. As can be readily appreciated, when coupled to the main computer system 102, a powerful media player thus may be built into an auxiliary device 301 without the expense of a hard drive and digital rights management components, which are a significant expense in such portable devices today. At the same time, as long as the auxiliary device 301 has a relatively reasonable amount of buffer space, the main computer system 120 may be mostly asleep, providing a media player with a relatively long-life power source. Fetching calculations or operations in advance are helpful. By way of example, consider a list of songs, even if randomized beforehand. If the list is known in advance and the auxiliary device can handle a plurality of tracks, there is no need to fetch per track, instead fetching as much as possible to minimize the amount of waking needed (unless the user interacts and alters the ordering).

As can be readily appreciated, the amount of power saved corresponds to the duty cycle of waking the main computer system 120; i.e., the less percentage of time the CPU is awake, the disk is spinning and so forth, the more power that is saved. Thus, the main computer system 120 may be configured to maintain some power to its main memory or other caches when in some sleep state, or use some amount of non-volatile storage such as flash memory, so as to spin up the disk drive less frequently, yet still provide the needed data on demand. The less hardware that is powered, the more power that is saved as well, e.g., some minimum to retrieve the needed data that avoids powering the display, network cards, LEDs and/or the like whenever possible is generally desirable.

In accordance with another aspect of the present invention, not only may data related to a request be fetched in response to actual or anticipated demand, but unrelated data that is deemed likely to be needed may be fetched at a time that the main computer system has been awakened for the needed data. Consider an example in which an auxiliary device 301 playing audio has awoken the main computer system 120 to fetch some amount of data, and there is still room in the cache, (which may be by design). Other data unrelated to the audio data requested may also be fetched at such a time, since the main computer system 120 is operational to some extent to provide data. Note that the data requests may be ordered, such as to fetch what is needed first, then get extra data if otherwise allowed or possible, e.g., within a time window, if memory is available, if the network is available to the computer system 120, and so forth.

Figure 7:
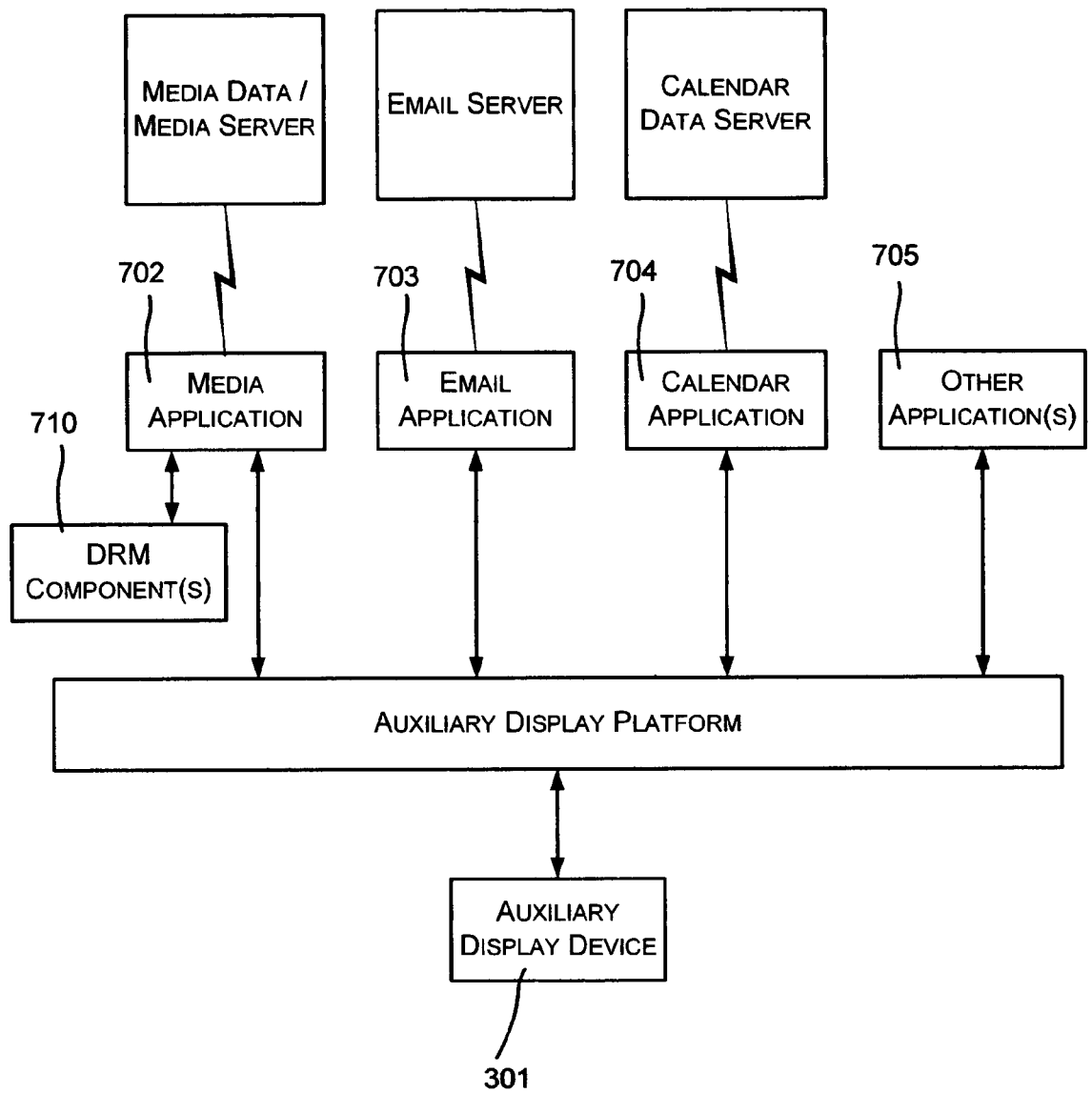
FIG. 7 is a block diagram generally representing application programs providing auxiliary data when the main computer system has been awakened in accordance with an aspect of the present invention.

By way of example, FIG. 7 shows how calendar data, email data and so forth may be updated at the same time the machine is awake to fetch audio data, using suitable application programs 702-705. As mentioned above, the media application 702 may take advantage of digital rights management via one or more DRM components 710, thereby not requiring the auxiliary display device to perform digital rights management. Note that fetching additional data will generally consume more power per this partially awakened state than would not fetching the data, as in general, transferring more data will wake the machine for longer than otherwise, and will wake it for still longer yet, if, for example, the network card has to be powered up to obtain the updated calendar and email data, applications need to be loaded, and so forth. However, the overall power consumed may be lowered by reducing the duty cycle of waking the main computer system. For example, the main computer system may be scheduled for a wakeup shortly to fetch these other types of data, and thus may as well get it in conjunction with the current demand. In other words, although everything may be user-configurable as to what is allowed and when, the auxiliary device may be set to wake the main computer system every half-hour, but if the machine is awake and the auxiliary device is already downloading content for another reason, the other content may be retrieved now, and the timer reset.

When the data has been retrieved, the auxiliary device may use the control channel to put the main computer system back into a sleep state. Since the computer system 120 is awake and communicating with the auxiliary device over the data channel, it can communicate data to the device so that sleep state data is known to the auxiliary device. For example, the main computer system 120 would not be put back into a sleep state if the user has now begun using the main computer system 120, which may be a common occurrence if the user notices the device is awake such as by hearing the disk drive spin up. To this end, the main computer system may sense e.g. the opening of the lid switch, mouse activity, keyboard activity, or touch-screen or electromagnetic digitizer activity (e.g. if a tablet-based PC) in order to provide this information to the auxiliary display device. Also, the main computer system may return to a sleep state on its own. Other, non-SMBUS wake mechanisms may communicate with the main computer system when awake (e.g., via an API call) to obtain such information.

Essentially any suitable mechanism and/or criteria may be used to detect when the data has been retrieved and no more is forthcoming or allowed, whereby the main computer system may be returned to a sleep state. A common occurrence will be when each application program signals that it is done providing its requested data. For other situations, a timeout mechanism may be used to handle programs and the like that do not properly respond, a memory full condition may disallow further data, and other components such as a heat sensor, low battery life detector and so forth may be used to control the power state of the main computer system. Signal strength data may be used to cancel a request, e.g., do not wait for any network data if there no network connection.

Note that application programs, including those that will provide data beyond what is currently needed, may register resource-related metadata corresponding to certain criteria that need to be met before waking the main computer system to request their types of data. For example, if a program needs a certain resource (e.g., network connectivity, a fingerprint reader and so forth) and that resource's unavailability state is known to the auxiliary device, the device can decide not to request that program's data, which may result in not waking the main computer system because no data is needed. Further, note that regardless of any application program's registration of needed resources, the auxiliary device can independently choose not to wake the main computer system based on some criterion related to the main computer's system's state and/or even the state of the auxiliary device, such as the battery level of either, or some other state such as the presence or absence of wireless networking. Thus, although the device may have a need and/or opportunity for more data, the data need not be requested until some threshold likelihood with respect to the ability to get the data is achieved and/or it otherwise is logical to do so. Such registration of applications for resources may range from very limited details to full details.

Further, a resource state change can cause a wake to occur. For example, if a previous data synchronization failed because of no network connectivity (e.g., no wi-fi signal), whether failed by the application program running on the main computer system or because the synchronization was not even attempted by the auxiliary device, when connectivity is detected, the presence of the signal may be used as a basis for waking the main computer system.

As can be seen from the foregoing, the present invention provides for an auxiliary device to wake a main computer system to obtain data based on actual or anticipated need, and then cycle the main computing device back to a sleep state. This conserves power on the main computing device, while letting the auxiliary device leverage the full capabilities of the main computer system as needed. The present invention thus provides numerous benefits and advantages needed in contemporary computing.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing environment having a main computer system and an auxiliary device communicatively coupled to the computer system, a method for waking the main computer system, the method comprising:

the auxiliary device maintaining a data cache, the data cache having been transferred from the main computer and stored within the auxiliary device;

after having transferred the data cache to the auxiliary device, the main computer entering a sleep state;

processing data from the data cache for output via the auxiliary device;

the auxiliary device performing auxiliary functionality while the main computer system is in the sleep state;

detecting a need for other data at the auxiliary device, the other data being stored within or accessible by the main computer system;

the auxiliary device determining that the other data is not contained within the stored data cache;

the auxiliary device waking the main computer system from the sleep state into a state in which the main computer system is capable of accessing and communicating the other data; and the auxiliary device receiving the other data from the main computer system.

2. The method of claim 1 further comprising, returning the main computer system to a sleep state that consumes less power than the main computer system consumes in the awakened state.

3. The method of claim 1 further comprising, determining on the auxiliary display whether while in the awakened state, the main computer system has been otherwise used in a manner that would awaken it, and if so, leaving the computer system in a current state, and if not, returning the main computer system to a sleep state that consumes less power than the main computer system consumes in the awakened state.

4. The method of claim 1 further comprising, determining on the main computer system whether while in the awakened state, the main computer system has been otherwise used in a manner that would awaken it, and if so, the main computer system leaving itself in a current state, and if not, the main computer system returning itself to a sleep state that consumes less power than the main computer system consumes in the awakened state.

5. The method of claim 1 wherein waking the main computer system comprises sending a signal on a control channel.

6. The method of claim 5 further comprising, listening at the auxiliary device for data on the control channel.

7. The method of claim 1 wherein receiving the other data from the main computer system comprises receiving media data.

8. The method of claim 1 further comprising, requesting the other data and requesting additional data beyond the other data after waking the main computer system.

9. The method of claim 8 wherein the additional data is obtained from a separate source with respect to the source of the other data.

10. The method of claim 9 further comprising, rescheduling a timed retrieval of the additional data after receiving the additional data.

11. The method of claim 1 further comprising, detecting that no more data is presently needed after receiving the other data from the main computer system.

12. At least one computer-readable storage medium having computer-executable instructions which when executed perform the method of claim 1.

* * * * *